(12) United States Patent
Bucher et al.

(10) Patent No.: US 9,027,466 B2
(45) Date of Patent: *May 12, 2015

(54) CAPSULE FOR THE PREPARATION OF A BEVERAGE EMBEDDING AN IDENTIFICATION ELEMENT

(75) Inventors: Peter Bucher, Besazio (CH); Alessandro Brazzola, Castel S. Pietro (CH); Alexandre Kollep, Lutry (CH); André Jung, La Croix Sur Lutry (CH)

(73) Assignee: Nestec S.A., Vevey (CH)

( * ) Notice: Subject to any disclaimer, the term of this patent is extended or adjusted under 35 U.S.C. 154(b) by 7 days.

This patent is subject to a terminal disclaimer.

(21) Appl. No.: 13/379,633

(22) PCT Filed: Jun. 21, 2010

(86) PCT No.: PCT/EP2010/058684
§ 371 (c)(1),
(2), (4) Date: Dec. 20, 2011

(87) PCT Pub. No.: WO2011/000725
PCT Pub. Date: Jan. 6, 2011

(65) Prior Publication Data
US 2012/0097041 A1    Apr. 26, 2012

(30) Foreign Application Priority Data

Jul. 3, 2009    (EP) ..................... 09164590

(51) Int. Cl.
*B65D 85/816*    (2006.01)
*A47J 31/00*    (2006.01)
*B65D 85/804*    (2006.01)

(Continued)

(52) U.S. Cl.
CPC ......... *B65D 85/8043* (2013.01); *A47J 31/3623* (2013.01); *A47J 31/4492* (2013.01); *B65D 2203/00* (2013.01)

(58) Field of Classification Search
USPC ............................... 99/295, 323, 280, 289 R
See application file for complete search history.

(56) References Cited

U.S. PATENT DOCUMENTS 4,297,557 A * 10/1981 Tyler et al. ..................... 219/713
4,510,489 A *  4/1985 Anderson et al. .......... 340/572.1
4,787,299 A * 11/1988 Levi et al. ....................... 99/285

(Continued)

FOREIGN PATENT DOCUMENTS

CN    101044071 A    9/2007
DE    201 21 494 U1   11/2002

(Continued)

OTHER PUBLICATIONS

Wikipedia; Barkhausen Effect; Aug. 21, 2008; http://web.archive.org/web/20080821014902/http://en.wikipedia.org/wiki/Barkhausen_effect.*
International Search Report and Written Opinion, PCT/EP2010/058684, mailed Aug. 2, 2010.

*Primary Examiner* — Dana Ross
*Assistant Examiner* — John J Norton
(74) *Attorney, Agent, or Firm* — Winston & Strawn LLP

(57) ABSTRACT

The invention relates to a capsule for the preparation of a beverage. The capsule includes first and second covering walls connected for forming a cavity containing a beverage ingredient and a contactless identifying element for identifying the capsule by detecting the identifying element using the detector of a beverage producing device. The identifying element is preferably disposed in the cavity.

19 Claims, 11 Drawing Sheets

(51) Int. Cl.
*A47J 31/36* (2006.01)
*A47J 31/44* (2006.01)

(56) References Cited

U.S. PATENT DOCUMENTS

| | | | |
|---|---|---|---|
| 5,790,029 A * | 8/1998 | Curnutte et al. | 340/572.1 |
| 6,698,333 B2 * | 3/2004 | Halliday et al. | 99/295 |
| 6,747,559 B2 * | 6/2004 | Antonenco et al. | 340/572.1 |
| 8,590,443 B2 * | 11/2013 | Mahlich | 99/290 |
| 8,857,317 B2 * | 10/2014 | Manser et al. | 99/289 R |
| 8,978,544 B2 * | 3/2015 | Leuzinger et al. | 99/295 |
| 2002/0048621 A1 * | 4/2002 | Boyd et al. | 426/77 |
| 2002/0057201 A1 * | 5/2002 | Manov et al. | 340/572.1 |
| 2004/0089158 A1 | 5/2004 | Mahlich | 99/275 |
| 2007/0163446 A1 | 7/2007 | Halliday et al. | 99/279 |
| 2007/0203587 A1 * | 8/2007 | Erlandsson et al. | 700/11 |
| 2010/0132564 A1 * | 6/2010 | Ozanne et al. | 99/275 |

FOREIGN PATENT DOCUMENTS

| | | |
|---|---|---|
| EP | 1 755 090 A1 | 2/2007 |
| EP | 1755090 A1 * | 2/2007 |
| EP | 1 890 271 A1 | 2/2008 |
| EP | 1 950 150 A1 | 7/2008 |
| FR | 2 912 124 A1 | 8/2008 |
| FR | 2912124 A1 * | 8/2008 |
| GB | 2 397 510 | 7/2004 |
| WO | WO 02/28241 A1 | 4/2002 |
| WO | WO 2005/044067 A1 | 5/2005 |
| WO | WO 2005044067 A1 * | 5/2005 |
| WO | WO 2005/079639 A2 | 9/2005 |
| WO | WO 2005/122851 A1 | 12/2005 |
| WO | WO 2007/122144 A1 | 11/2007 |
| WO | WO 2007122144 A1 * | 11/2007 |

* cited by examiner

CAPSULE FOR THE PREPARATION OF A BEVERAGE EMBEDDING AN IDENTIFICATION ELEMENT

This application is a 371 filing of International Patent Application PCT/EP2010/058684 filed Jun. 21, 2010.

BACKGROUND

The present invention relates to a capsule for the preparation of a beverage such as in a beverage producing machine, for instance, a coffee machine. The invention more particularly relates to a capsule comprising an identification element for enabling the detecting of the capsule inserted in the beverage producing machine. The invention also relates to a beverage producing device adapted to receive the capsule and to the combination of the two as a "system".

Beverage producing systems have been developed for many years on the basis of portioned beverages, in particular, capsules containing a predetermined dose of beverage ingredient such as coffee, tea, milk powder and the like. The numerous advantages of such systems have been widely recognized, in particular, their convenience of use, clean operations and better controlled quality of the brewed beverage delivered.

The term "capsule" is here used to designate packets, pods or cartridges as well.

It is known to associate a radio frequency (RF) identifier to the capsule for the purpose of recognizing the capsule which is inserted in the device such as by a reader. Such identification allows changing particular operations, in the beverage producing device, in response to the detection of the identifier. For instance, brewing operations can be modified accordingly for adapting them to the type of capsule detected. For instance, brewing parameters, such as water temperature, the beverage volume or others, can be changed.

WO02/28241 relates to an encoded coffee packet including a machine interpretable feature on the capsule, for instance, electromagnetically detectable, e.g., a magnetic data storage medium.

WO2005/044067 relates to a receptacle for preparing a beverage comprising a magnetic ribbon placed on the inside wall of the receptacle; the longer dimension of the ribbon extending circumferentially around the receptacle. To be correctly read by a magnetic reader, a relative rotating movement between the receptacle and reader is necessary.

FR2912124 relates to a portioned package for preparation of a beverage comprising two flexible walls connected by their seam and comprising an RFID tag for contactless reading which is positioned in a reinforced peripheral portion at the seam of the package.

EP1890271A1 relates to a method of controlling the dispensing of an infusion product with a container for a product dose and an RFID tag associated to a respective number of containers.

EP1755090A1 relates to a device for identification and verification of items with refundable deposit in particular for recycling glass or PET bottles using a magnetic, electromagnetic and/or optical identification means such as labels applied onto the items.

U.S. Pat. No. 6,747,559 relates to glass-coated amorphous magnetic micro-wire marker for an article surveillance.

The prior art solutions typically contemplate the association of a contactless identifier such as a radio-frequency tag with the beverage portioned package. The package generally forms the support for the tag and can be produced during manufacturing of the package.

Certain identifiers placed on the package can be deteriorated, removed or modified. Certain identifiers are particularly sensitive to pressure or bending and may be easily broken. In particular, the portion package is submitted to relatively high forces during mechanical and/or hydraulic closing of the beverage brewing unit around or onto the package.

As a result, the identifier can be damaged and is no longer readable and the capsule is irremediably wasted.

Furthermore, portioned package can be made of flexible walls, for packaging cost reasons or others, the package is thus sensitive to deformation, and thereby the position and integrity of the identification element, which is necessary for ensuring a reliable detection, cannot be guaranteed.

With identifiers placed in the seam as in FR2912124, a reinforced part may be necessary in order to ensure its physical integrity. It is so more difficult to connect the two flexible walls of the capsule together and to provide a good connection at the seam because of the presence of the reinforced portion (e.g., piece of cardboard or fibres) which generally forms a localized excessive thickness.

Certain identifiers require a minimal length and specific positioning to be read correctly. If not, the received signal is deteriorated, too weak or even not present. Therefore, placing the identifier on the package, in particular, at the seam may dictate important design constraints. For instance, the seam must be made larger, at least locally, and the capsule might no longer fit correctly through the slider of the beverage producing device or may require a specific orientation of the detection part of the capsule before being inserted in.

In particular, for detection technologies using an emission of a magnetic field emitted from at least one electromagnetic coil of the beverage producing device, the size and the position of the identifier on the capsule are determinant to ensure a correct reading of the modified signal of the identifier. If the signal received by the receiving electromagnetic coil is defective, this immediately results in a faulty or abnormal functioning of the beverage producing device.

The present invention aims at proposing a solution that provides more freedom on the design of the capsule, ensures a more reliable signal detection and is less prone to damage or deterioration of the identifier, e.g., during handling of the capsule.

For this, the main principle of the invention is for a capsule including a contactless identifier inside the cavity containing the beverage ingredient. In particular, the identifier is at least partially embedded in the mass of the beverage ingredient. As a result, the identifier is protected from the external mechanical constraints. Furthermore, the dimensions and positioning of the identifier can be changed in a more flexible manner without affecting the overall shape, structure and/or design of the enclosing package.

SUMMARY OF THE INVENTION

Therefore, the invention relates to a capsule for the preparation of a beverage comprising:
a first and second covering wall connected for forming a cavity containing a beverage ingredient;
a contactless identifying element for identifying the capsule by detecting the identifying element using detecting means of the beverage producing device;
wherein the identifying element is disposed in the interior of the cavity.

In a mode, the identifying element is at least partially embedded in the beverage ingredient. By "partially embedded", it is meant that the identifying element does not extend along its longer dimension along a covering wall of the capsule but at least one of the surfaces of the element is distanced from the covering walls by a space filled with beverage ingredient. More preferably, the element is fully embedded in the beverage ingredient. By "fully embedded", it is meant that at least 90% of the outer surface of the element is distant from the covering walls of the capsule or separated from the covering walls by beverage ingredient or a void.

More particularly, the identifying element can be a magnetically-responsive element for enabling detection of the capsule in presence of an alternating current magnetic field produced by a magnetic-field producing device.

By "magnetically-responsive", it is here meant that, in a general manner, the identifying element (or also referred in short as: "identifier") has magnetic or ferromagnetic characteristics, in particular, Barkhausen characteristics, corresponding to its specific composition and identifiable, or at least discriminable, compared to another composition or relative to one or more magnetic characteristics of reference, under the effect of magnetic flux provided by electromagnetic detecting means.

Preferably, the first and second covering walls are connected along a peripheral seam such as by welding, crimping, gluing and combinations thereof.

More particularly, the magnetically-responsive element is an elongated element, such as comprising one or more wires or one or more bands.

The wire or band is preferably oriented substantially along the median longitudinal axis of the capsule.

By "oriented substantially along the median axis", it is meant that the element including the magnetically-responsive material, e.g., wire(s), is aligned or parallel with the longitudinal axis or, eventually, is inclined relative to median longitudinal axis by an angle lower than 45 degrees, preferably lower than 10 degrees.

The "longitudinal axis" of the capsule is meant to designate the axis passing through the centre of the capsule, orthogonal to the transversal plane of the capsule passing through the seam of the capsule and traversing the first and second walls in their respective median regions.

The element can indeed be parallel to the longitudinal axis of the capsule and distanced from said axis by a few millimetres provided that a magnetic readable response is obtained enabling its identification.

An advantage of such particular orientation comes from the ability to maintain a determined position of reference of the identifier relative to the detecting means of the beverage producing device. As a result, the position of the capsule in the beverage producing device is not critical as long as the position of the identifier in the device is itself maintained in this determined position of reference. This configuration also enables to greatly simplify the design of the capsule. The external design and/or volume of the capsule can vary whereas still producing a readable signal. It also participates to the simplification of the design of the beverage producing device, in particular, in relation to the position, the size and the number of the detecting devices.

In particular, the detecting means of the beverage producing device comprise an electromagnetic emitter and an electromagnetic receiver for creating magnetic flux in proximity of the identifying element.

The emitter and receiver typically provide a magnetic field obtained from an alternating current and forming a sinusoidal or triangular signal at a relatively low frequency (i.e., 35-60 Hz). Upon exposure of the identifier to the magnetic field, one or more Barkhausen jumps (or voltage pulses) are generated which are detected by the electromagnetic receiver.

In order for the identifier to be detected, the identifier extends in a position substantially tangent to the lines of the magnetic flux as generated by the detecting device. Therefore, by placing the identifier along the median longitudinal axis of the capsule, the emitter and receiver can be placed anywhere relative to the capsule containing the identifier but at proximity of the capsule and about the axis, or more precisely about the central axis of the brewing chamber which receives the capsule. These requirements can easily be taken into account and a relatively compact capsule holder can be designed to support and easily integrate the detecting device, i.e., the emitter and receiver.

The first and second covering walls can be made of flexible packaging material such as thin aluminium, plastic, filter paper or combinations thereof. The first and second covering walls may be intended to be perforated by perforated means of the beverage producing device for respectively enabling the introduction of water in the capsule and the delivery of the liquid extract from the capsule. In another mode, one of the covering walls can also be a substantially rigid body which is closed by the second covering wall such as a flexible foil member or a flexible pre-perforated wall. In another mode, both covering walls can be made of relatively rigid material and pre-perforated. In another mode, the covering walls are formed of filter material such as a porous paper or a plastic membranes with many small holes.

In a mode, the capsule can be symmetrical along a transversal plane passing through the peripheral seam and the magnetically-responsive element is so placed substantially perpendicular to the median plane (P). The symmetry of the capsule provides the advantage to ensure a reading irrespective of the side of insertion of the capsule in the beverage producing device i.e., when the capsule is in place or being moved to the capsule holder.

In a preferred mode, the magnetically-responsive element comprises magnetically-responsive material providing at least one Barkhausen jump.

The magnetically-responsive element may comprise at least a cover such as a sheath, a strip, a label or ribbon containing magnetically-responsive material. The cover provides the advantage to be handleable and easily and reliably orientable along its length in alignment with the reference axis of the capsule at the tangent of the magnetic flux. The cover, e.g., sheath, can be formed of an extruded portion of plastic or other material (e.g., rubber, cellulose) surrounding the magnetically-responsive material. More preferably, the cover, e.g., sheath, is extruded around the magnetically responsive material. The cover, e.g., sheath, can be a tubular portion wherein the void is filled by the material. It preferably comprises a cylindrical outer surface although other shapes are possible such as ovoid, square or rectangular. This element is also a more compact or economical solution compared to an RFID tag.

More particularly, the magnetically-responsive material is made of at least one wire containing different chemical elements from the periodic table, in particular metals. The wire has a glass coating containing these elements. For instance, the wire contains metals and/or other magnetically-responsive elements such as metalloids. Typically elements such as Cobalt, Chrome, Iron, Silicium, Boron in different ratios, thereby form different combinations. Each combination of metals and metalloids forms a metal based alloy. Each combination thus provides particular magnetic characteristics, e.g., a particular magnetic polarity or hysteresis (B-H) loop, to the wire when excited by the magnetic field.

In a mode, the cover, e.g., sheath, contains a single wire. In other possible modes, the cover contains several wires. In a mode, the cover contains two wires or three wires. The wires are not necessarily rectilinear but may be curved to some extent. The wires can be oriented in parallel in the cover or may be arranged in an elongated braid. Preferably, the wires are spaced apart a certain distance in the cover.

The cover can be made of material such as polypropylene, polyethylene, PET, polyamide, polystyrene, PLA, starch-based material, cellulose and combinations thereof.

An individual wire typically provides a specific response profile, dependent on its composition, to the coiled receiver upon induction of a magnetic energy produced by the coiled emitter, at a certain frequency (e.g., 35-60 Hz). In particular, the wire can generate a specific coercivity in the alternating electromagnetic signal thereby providing a "bit" of encoded information. Thereby, the combination of the different wires provides various specific combinations of response profiles which can be obtained and compared to set profiles of the detecting device for identification. Therefore, a specific magnetic response profile represents a unique code. In particular, a wire having same composition of compounds will provide one code. Different wires having different compositions relative one another will provide different discriminable codes. A plurality of micro-wires will therefore provide a multi-bit code. The number of discriminable codes is so linked to the ability to industrially produce wires of different compositions and to identify their response profiles and compare them to set references by the detecting and control means.

Preferably, the magnetically-responsive wire has a longer dimension (length) of between 5 and 20 mm, most preferably of between 8 and 15 mm. The wire has a diameter comprised between 10 and 200 microns. Basically, the cover, e.g., sheath, contains one or several wires of length between 8 and 15 mm and diameter of about 20-75 microns.

Typically, when several wires are extruded with the cover, e.g., sheath, the resulting element can have an external diameter of between 0.5 and 3 mm, more preferably of between about 0.8 and 1.5 mm.

In a possible mode, the magnetically-responsive element can be further protected in a protective outer casing to facilitate handling. The casing is preferably rigid to prevent the element to be bent during handling and forming of the capsule. The casing is also preferably liquid-tight and resistant to pressure of liquid in the cavity during brewing of the beverage. Therefore, the element is isolated and protected by the outer casing to avoid transfer of material from and to the element. More particularly, the casing is at least partially embedded in the beverage ingredient. By "partially embedded" it is meant that the casing is surrounded on at least 60% its surfaces by the beverage ingredient, e.g., coffee powder or a void. As a result, the casing is not easily accessible and protected, such as from external pressure, by the ingredient itself or a void.

The casing can preferably be made of foodgrade plastic or other material. For instance, it can be made of an injected polypropylene, polyethylene, polyamide, polystyrene or combinations thereof. The thickness of the outer casing may vary depending on its mechanical properties but preferably its thickness is of at least 1.0 mm on all surfaces surrounding the protected element (i.e., the sheath containing glass coated wire(s)).

Preferably, the protective casing forms a tubular portion extending along the median axis (I) of the capsule and closed at its both ends.

Furthermore, the casing may further extend by a disc portion from the tubular casing along the median transversal plane (P) passing by the peripheral seam of the capsule. This configuration enables to improve the distribution of liquid in the capsule which traverses the beverage ingredient, in particular, ground coffee. The disc portion forces the liquid entering the capsule, via one of the two walls, to flow transversally along the surface of the disc portion. As a result, an improved wetting can be observed compared to a casing with no disc portion, thereby resulting in coffee beverages with comparatively higher solids content. The results may vary depending on the dimension of the disc portion, e.g., ratio of the disc diameter to the cavity diameter at the median plane. Of course, the diameter of the disc is preferably shorter than the internal diameter of the cavity along the median plane but, more preferably it is at least twice shorter than the internal diameter of the cavity.

According to a preferred aspect of the invention, the beverage ingredient is in compacted form in the cavity. By "compacted" it is meant that the ingredient is formed as one or several tablets of compressed powder, such as roast and ground coffee powder. The ingredient can be compressed when placed onto one of the two walls during manufacturing or be compressed in a separate operation and then transported onto the wall before sealing of the second wall.

A compacted ingredient prevents the identifier from moving thereby ensuring a more precise location, as previously defined, even after transport and/or handling before its insertion in the beverage producing device. Compaction of the ingredient is carried out to form a food element that can be handled in one piece with the identifier embedded therein. The element normally resists breakage under a force of at least 5 Newton applied on its lateral sides.

The invention also relates to a capsule for the preparation of a beverage comprising:

first and second covering walls connected at a peripheral seam for forming a cavity containing a beverage ingredient;

an elongated contactless element comprising at least one magnetically-responsive wire for identifying the capsule by detecting means of the beverage producing device.

In a preferred mode, the at least one magnetically-responsive wire is placed substantially orthogonally relative to the transversal plane passing along the seam of the capsule.

By "substantially orthogonal", it is meant that the wire is purely perpendicular to the transversal plane or inclined relative to the longitudinal axis of the capsule of an angle lower than 45 degrees, more preferably lower than 10 degrees.

The capsule can be symmetrical or non-symmetrical along the transversal plane passing through the transversal seam.

In a mode of the invention, the capsule comprises a cup-shaped body and a bottom wall sealed onto the body; wherein the identifying element is connected to the inner sidewall of the body.

The bottom wall can comprise a tearable membrane, e.g., aluminium and/or plastic, or a porous wall or a combination thereof.

The present invention also relates to a beverage producing device adapted for receiving a capsule as aforementioned, said device comprising:

a brewing unit for receiving the capsule in a brewing chamber, detecting means for detecting an identifying element contained in the capsule, wherein said detecting means are positioned substantially coaxially around the median longitudinal axis of the brewing chamber.

The present invention also relates to a beverage producing system comprising a beverage producing device adapted for receiving a capsule as aforementioned, said device comprising :

a brewing unit for receiving the capsule in a brewing chamber, detecting means for detecting an identifying element contained in the capsule, wherein said detecting means are positioned to detect the identifying element of the capsule when placed substantially along the median longitudinal axis of the brewing chamber.

The identifying element of the capsule is placed "substantially along the longitudinal axis of the brewing chamber" when its longer dimension's axis is aligned with or parallel to the longitudinal axis of the brewing chamber or is inclined relative to said axis of the brewing chamber of an angle lower than 45 degrees, more preferably lower than 10 degrees.

More preferably, the detecting means provide a magnetic flux in such a manner that the median longitudinal axis of the brewing chamber becomes substantially tangent to the lines of flux. In particular, the detecting means are formed of a magnetic field producing-emitter and magnetic field producing-receiver. In particular, the emitter and receiver are formed of magnetic coils which are positioned in such a manner that their respective central axes are aligned with the median longitudinal axis of the brewing chamber.

The identifier and magnetic coils of the emitter and receiver are positioned relatively one another so that the identifier extends along its longer dimension in a direction aligned or parallel to the central axes the magnetic coils. Of course, as already mentioned, a 45-degree relative deviation, preferably 10-degree relative deviation is tolerated provided the projected length of the identifier is sufficient for providing a readable response.

The emitter and receiver preferably comprise circular electromagnetic coils. The electromagnetic emitter can comprise one or two coils. In a possible configuration, the electromagnetic emitter comprises a single emitting coil and the electromagnetic receiver comprises a single receiving coil. In another configuration, the electromagnetic emitter comprises two coils and the electromagnetic receiver comprises one coil. The emitting and receiving coils can be placed on the same side or on opposite sides of the brewing unit. The receiving coil is preferably of smaller diameter than the emitting coil(s).

In an alternative, for a more uniform electromagnetic field, the electromagnetic emitter comprises a Helmholtz coils configuration, i.e., a first and second (i.e., or a pair of) emitting coils separated by a distance equivalent or close to the radius of the circular loops, which produces a homogeneous magnetic field in the median plane between the two coils. In a Helmholtz coils configuration, each emitting coil can be placed on a respective side of the brewing chamber. A receiving coil of the receiver can be placed on one side of the brewing chamber, preferably inside one of the two emitting coils. The receiving coil is preferably coaxial with the second emitting coil and placed along the median longitudinal axis of the brewing unit.

Moreover, the detecting device comprises a shielding around the emitter and receiver to protect them against the external magnetic interference. The shielding preferably surrounds the brewing chamber. The shielding preferably isolates the emitter and receiver from the central control unit of the beverage producing device.

The device furthermore comprises a control unit including an electronic interface and programs for analyzing the information as received from the detecting means and controlling the device in response to said information. The control includes selectively changing brewing parameters (e.g., temperature, volume, pressure, etc.) in the device depending on said information.

The present invention also comprises a capsule system comprising a beverage producing device and capsules adapted to be inserted in such device as aforementioned.

In particular, the system is configured with capsules pertaining to different predetermined types; each type comprising capsules including an identifying element providing the same ferromagnetic characteristics within the type and different ferromagnetic characteristics between the types. As a result, capsules pertaining to a same type can be detected by the electromagnetic detecting means by providing a recognizable magnetic response enabling to identify the capsules of a same type. In particular, the identifying element of capsules belonging to the same type is made of the same composition of material, i.e., wire(s) of metallic alloy and the identifying element of capsules belonging to different types is made of different compositions of materials, i.e., wire(s) of different metallic/metalloids alloys.

The capsule of the invention contains a beverage ingredient which can be ground coffee, green coffee, soluble coffee, leaf tea, herbal tea, soluble tea, milk powder, cocoa powder, culinary powder, infant formula powder and any combinations thereof.

The system further comprises detecting means and control means, as aforementioned, enabling to respectively detect the electromagnetic profiles of the elements in the capsules of each type and then identify the capsules of each type.

BRIEF DESCRIPTION OF THE DRAWINGS

Further features and advantages of the invention will be explained in relation to the appended drawings.

DETAILED DESCRIPTION OF THE INVENTION

Figures 1, 1A, 1B:
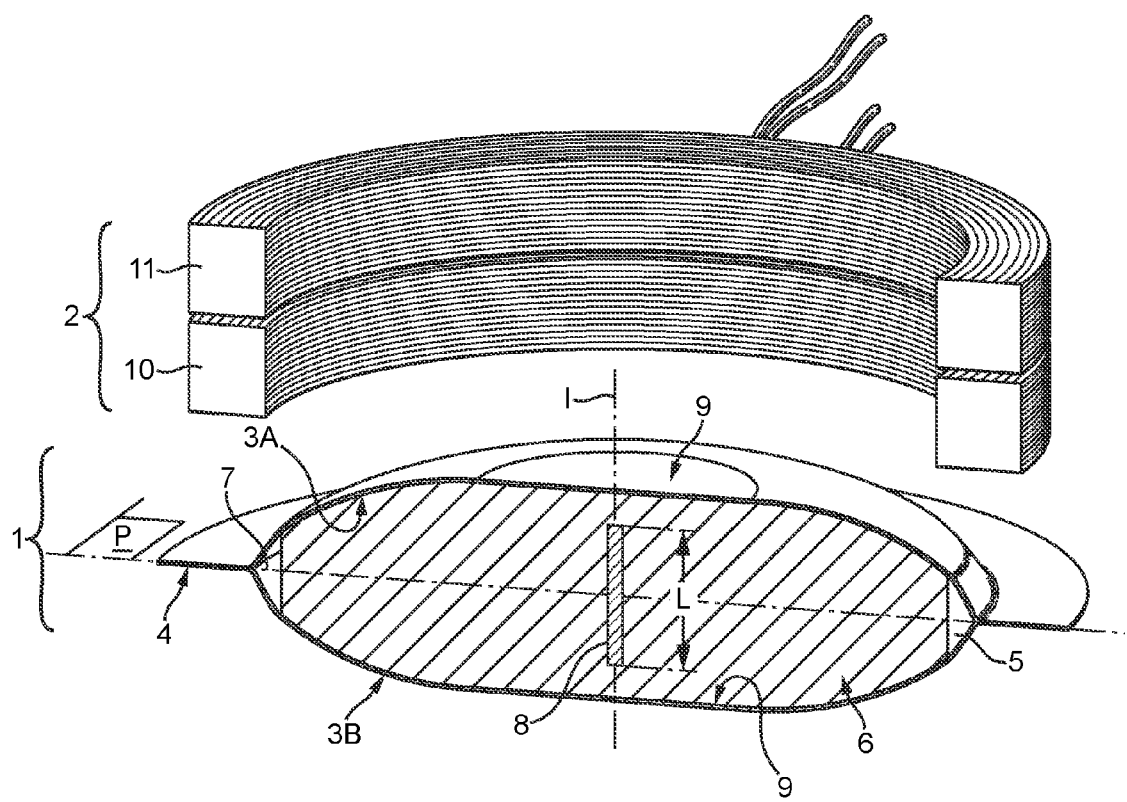
FIG. 1 shows a schematic cross section of the capsule of the invention in conjunction with a detecting device of the beverage producing device.
FIG. 1A is a cross-section and enlarged view of the identifier along plane P of FIG. 1 according to a first embodiment.
FIG. 1B is a cross-section and enlarged view of the identifier along plane P of FIG. 1 according to a second embodiment.

In reference to FIG. 1, the capsule 1 of the invention is intended to be placed under the magnetic influence of a magnetic detecting device 2, or sensor, at a predetermined location and distance. The magnetic detecting device 2, or sensor, is preferably positioned in the beverage producing device (not shown) and is activated when the capsule has reached the detection operational position as will be explained later on. The sensor provides signals to an analyser (not shown) associated to the sensor which can be placed remotely from the sensor in the beverage producing device.

The container of the capsule can be symmetrically formed of a first wall 3A and an opposed wall 3B. The two walls may be permeable or impermeable to the liquid. If impermeable to liquid, the two walls 3A, 3B will be opened, such as by perforation, before or at the time of use in the beverage producing device. The walls may further be impermeable to gas when a gas barrier layer is present in each wall, e.g., a layer of thin aluminium or EVOH. The container may further comprise internal filter layers such as of paper filter for instance. The two walls may also be formed entirely of filter paper.

The two walls 3A, 3B connect together at a seam 4 along a median transversal plane P. The seam can be produced by welding of a peripheral portion of each wall. The seam is preferably resistant to tearing and may be reinforced by additional layers such as cellulose (e.g. paper), polymeric fibres, plastic, rubber and the like. The walls can be flexible for facilitating forming during manufacturing and reducing the packaging material content. The walls can have an inner layer made of a layer compatible to sealing such as oriented polypropylene (OPP). The wall may also contain a decorative layer. In a preferred packaging configuration, each wall is formed of a multi-layer comprising the following layers (from exterior to interior): PET/Colour layer/Adhesive/Aluminium/Adhesive/OPP. The aluminium layer has preferably a thickness between 10 and 80 microns, an OPP (i.e., oriented polypropylene) layer has a thickness of between 5 to 40 microns and PET layer of between 5 and 40 microns.

The walls could also be formed of filter paper and a welding layer for the seam or a combination of aluminium, filter paper and plastic.

The connected walls 3A, 3B delimit an internal cavity 5 which can be at least partially occupied by beverage ingredient 6. In a preferred embodiment, the ingredient is roast and ground coffee. The beverage ingredient is preferably in compacted form such as a tablet. At the periphery of the compacted mass, an annular void 7 might be present. Eventually, the cavity may be placed under partial vacuum before sealing at the seam for preventing the walls to deform outwardly due to gas (e.g., $CO_2$) release from coffee powder. The resulting general form of the capsule can be a symmetrical lenticular container of substantially convex surface on both sides.

According to the principle of the invention, a contactless identifying element 8 is placed inside the cavity 5, more particularly within the mass 6 of ingredient.

Since the mass is compacted, the element 8 is firmly maintained in a relatively precise location within the capsule. As a result, although the element is invisible from the exterior, the capsule becomes reliably detectable when placed in a predetermined position relative to the detecting means 2.

More preferably, the identifying element is formed of a plastic, e.g., polypropylene, extruded sheath containing magnetically-responsive material, which is substantially aligned relative to the median longitudinal axis I of the capsule which traverses the first and second walls 3A, 3B substantially in their central regions 9. The element can be rigid, semi-rigid or flexible. However, when placed within the capsule it should be at least maintained rectilinear to ensure a correct detection. Due to its central location combined to the mass of ingredients surrounding the element, even if relatively flexible, the element is difficult to bend without damaging the outer package and in that respect it is relatively well protected against external mechanical constraints.

As illustrated in FIG. 1A, the identifier 8 contains a magnetically-responsive element in the form of a sheath 40 containing a particular material composition sensitive to a magnetic field. The material is capable of altering the voltage magnetic signal by producing a clearly identifiable Barkhausen jump when excited by a magnetic field provided by an electromagnetic emitter. For instance, three or more metal alloy-containing wires 41, 42, 43 coated by a very thin glass coating 45 are embedded in the sheath. The multiplicity of wires provided in the identifier enables to provide a more complex signal, e.g., a plurality of jumps (essentially, one discriminable jump or pulse per wire) therefore more codes available. The wires are preferably separated by a distance of at least 0.5 mm, preferably a distance between 1 and 2 mm. If the wires are too close to each other, the response of one wire is influenced by the presence of the other wire and can generate errors in the interpretation of the signal. The sheath is preferably made of plastic, such as polypropylene, polyethylene, polyamide and combinations thereof. The sheath provides an additional thickness to the wires for facilitating their manipulation and insertion in the capsule. It should be noted that the sheath can take a different cross-section, for instance, a rectangular or triangular form.

In FIG. 1B, the identifier 8 is also formed of a sheath 40 surrounding a single metal alloy-containing wire 44. The diameter ($d_2$) of a wire is generally of about 25-75 microns. The diameter ($d_1$) of the sheath depends on the number of wires in the element but it should be sufficient to facilitate handling and positioning in the capsule. Its diameter is typically between about 0.8 and 1.5 mm.

Figure 2:
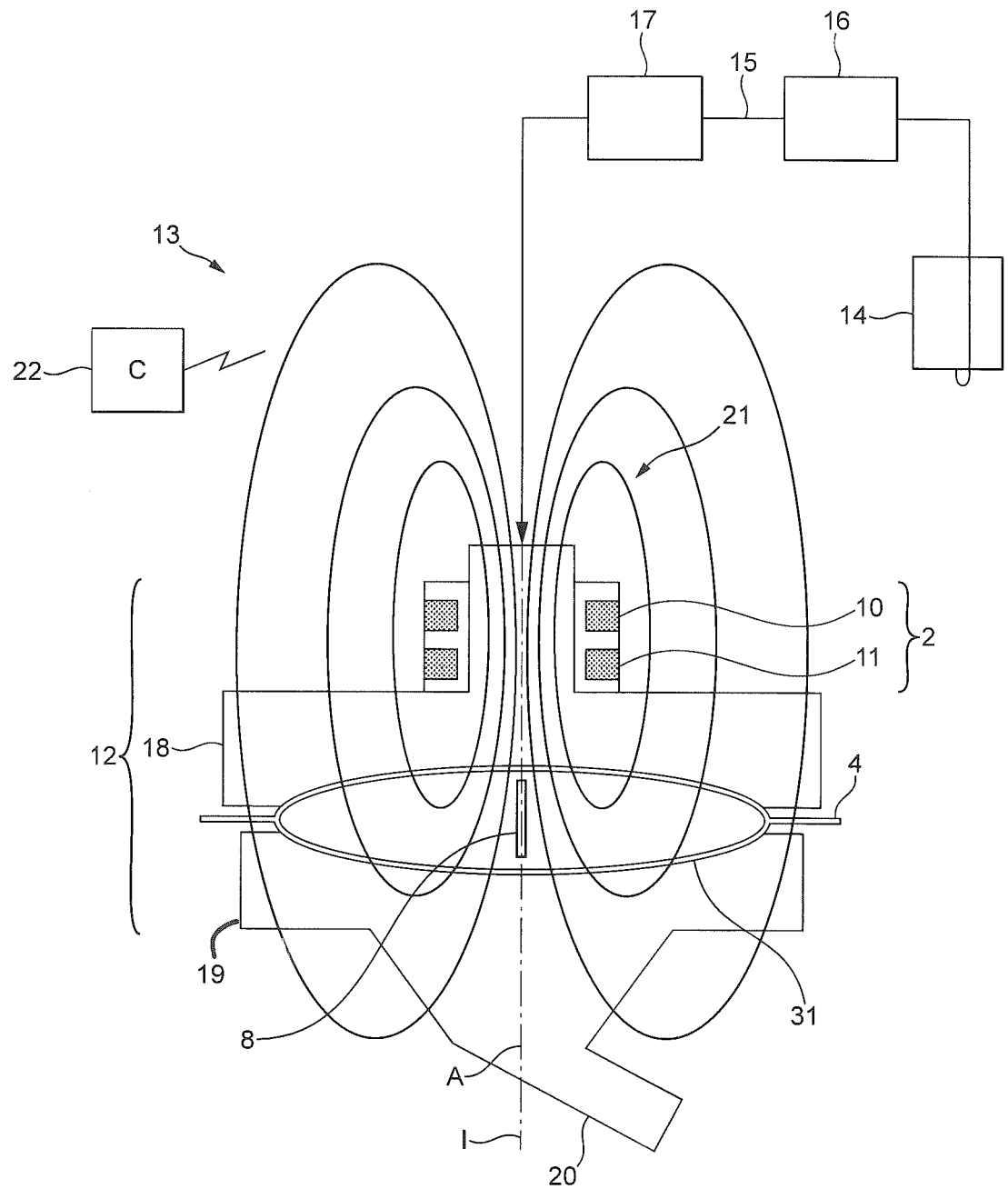
FIG. 2 illustrates a first detection mode in cross section when a capsule of the invention is placed in a beverage producing device.
Figure 3:
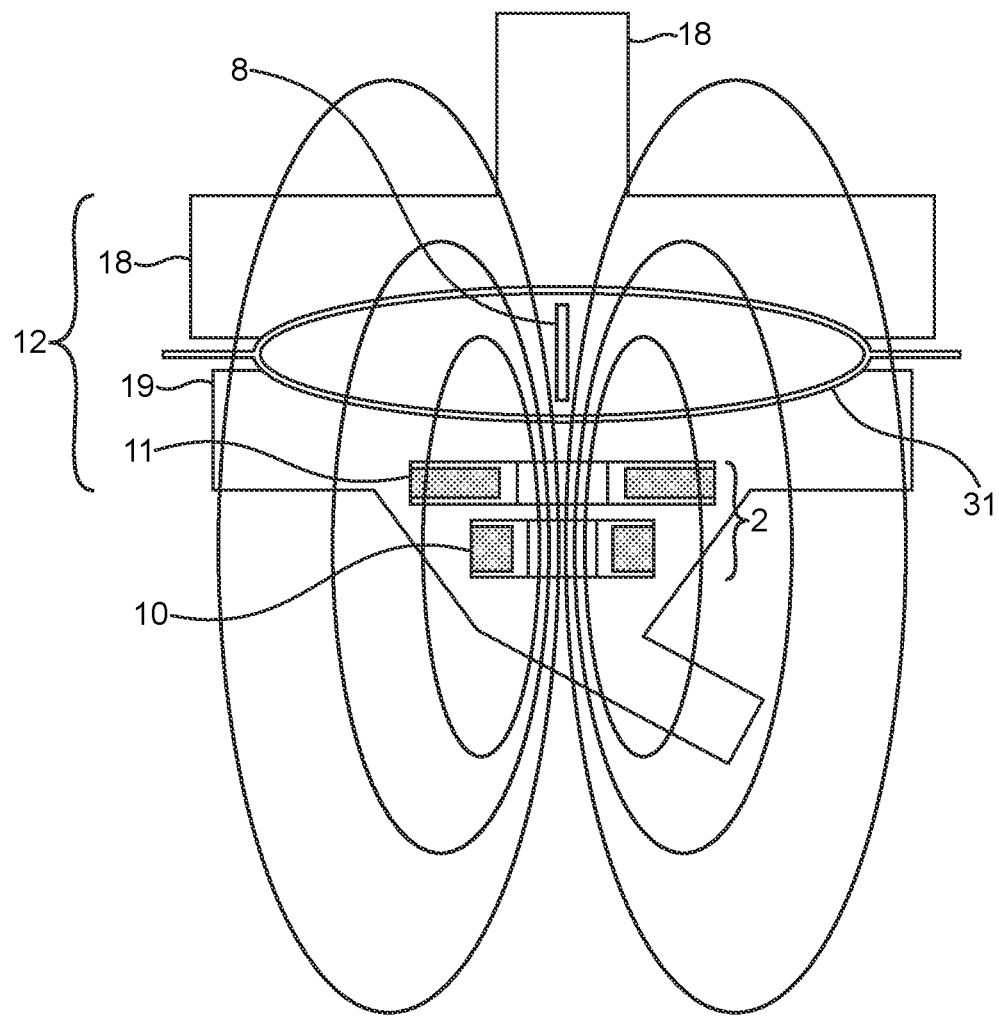
FIG. 3 illustrates a second detection mode with the same capsule in cross section of FIG. 2.

As illustrated in FIGS. 2 and 3, an emitting coil 10 induces, at a certain frequency (e.g., 10 to 150 Hz), magnetic energy into the identifying element 8. Depending on the energy level, the molecular polarity of the wire(s) will change and can thereby be detected as a specific response profile by a receiving coil 11. This effect is known as Barkhausen effect and it can be detected by the receiving coil. Therefore, the response profile of the magnetization or flux density curve changes depending on the particular metal composition of the wire. The alloy material for the wire and its manufacturing method are securely controlled to ensure the repeatability of the altered magnetic signals. Hence, a same wire composition will so produce a repeatable and identifiable profile response.

FIG. 2 shows a first embodiment in which the detecting device 2 is placed at the injection side of the brewing unit 12 of the beverage producing device 13. The device 13 further comprises a water tank 14, a water line 15, a water pump 16 and a water heater 17. The water line 15 communicates with the water feed part 18 of the brewing unit. A controller 22 is also provided in the device for operating the beverage producing machine. The controller can comprise the analyser for the detecting unit 2 for receiving and treating the signals coming from the detecting unit and setting in return the brewing parameters for controlling the elements of the device, e.g., the pump, water heater, etc., accordingly. The analyser can be formed of an electronic microchip that controls the detecting unit and validates the accuracy and validity of the capsule detected.

In other possible applications, the detecting means and analyser could be placed outside the beverage producing device. For instance, these means could be installed at the capsule manufacturing line or at an inventory control area to control the presence the identifier in the produced capsules, identify or sort the capsules.

The capsule 1 of the invention is further maintained in the brewing chamber 19 of the unit by a capsule holder 19 comprising beverage delivery means 20, e.g., a liquid duct. When the capsule is inserted in the brewing unit 12, e.g., on the lower parts 19, the identifier 8 is positioned with its median longitudinal axis I substantially aligned along median axis A of the brewing chamber 31. Identification can be started before or after closing of the brewing chamber 31. Closing of the brewing chamber is carried out by relative movement of the two parts 18, 19 and pinching the capsule along its seam. The detecting means 2 can so be positioned on the injection part 18 about the axis A. The emitting coil 10 and receiving coil 11 are thus in coaxial configuration around axis A. The receiving coil 11 is preferably placed closer to the identifier 8. In order to allow detection, the lines of magnetic flux 21 generated by the detecting device 2, (i.e., electromagnetic coils 10, 11) are maintained substantially tangent to axis A, thereby making possible the detection of the identifier. It should be noted that detection could be possible with the median axis I of the capsule forming a low angle of inclination relative to the median axis A of the brewing chamber. Such angle is preferably no larger than 30 degrees, most preferably, no larger than 10 degrees. Therefore detection of the capsule can be carried out during the transfer of the capsule to the brewing chamber. However, most preferably, the capsule is maintained static relative to the beverage producing device during the detection operation.

FIG. 3 is a variant in which the detecting means 2 are placed in the capsule holder 19 still about the median axis A of the brewing chamber to make possible the detection of identifier 8 in the capsule when the capsule is placed in the brewing chamber 31.

Figure 4:
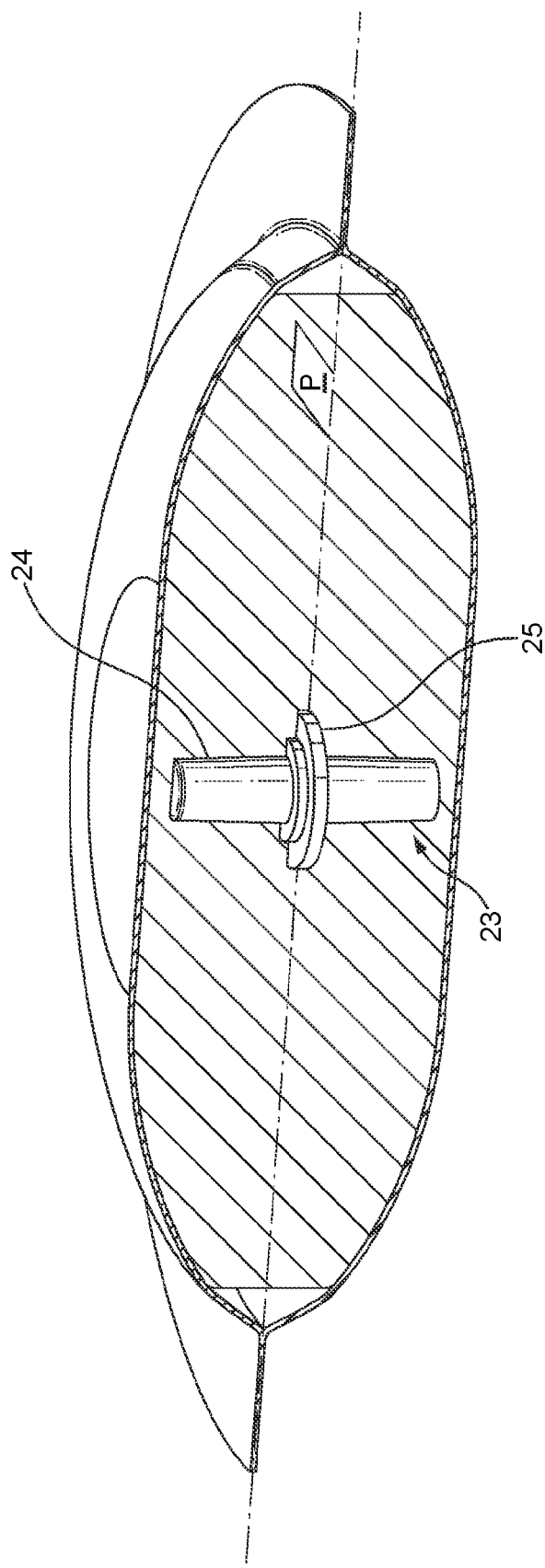
FIG. 4 is a partial cross section view of a capsule according to a second embodiment.
Figure 5:
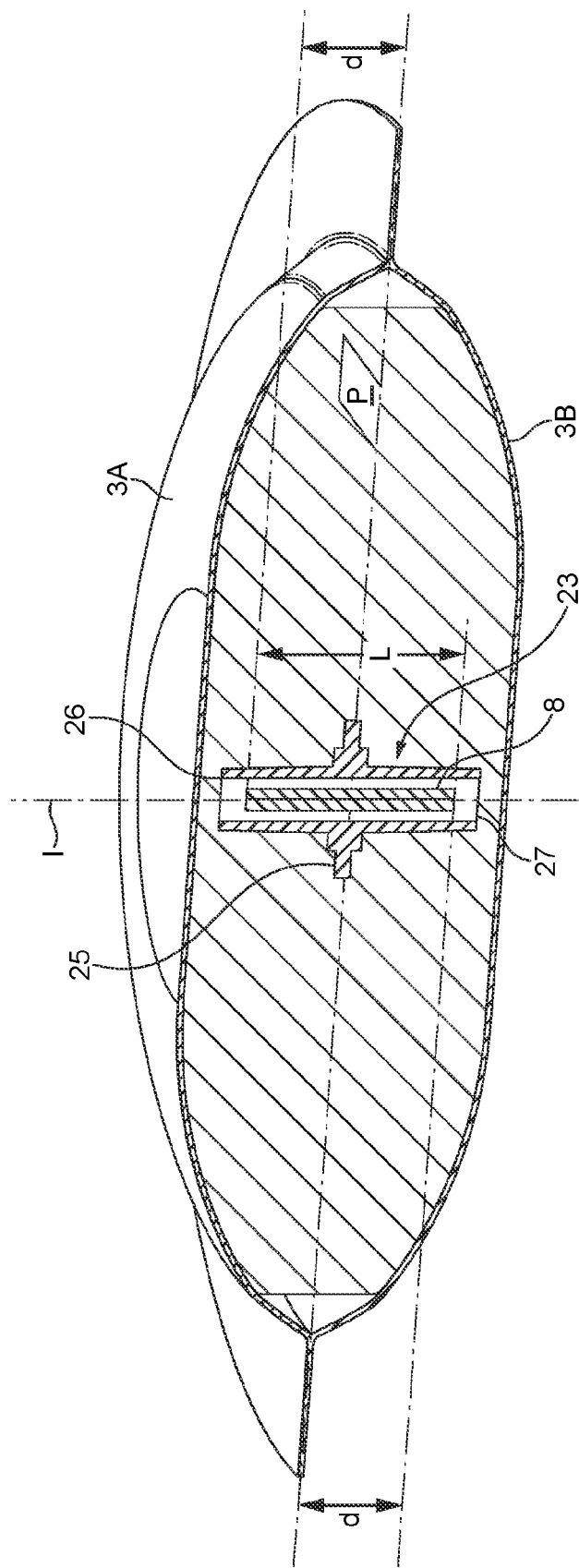
FIG. 5 is a cross sectional view of the capsule of FIG. 4.
Figure 6:
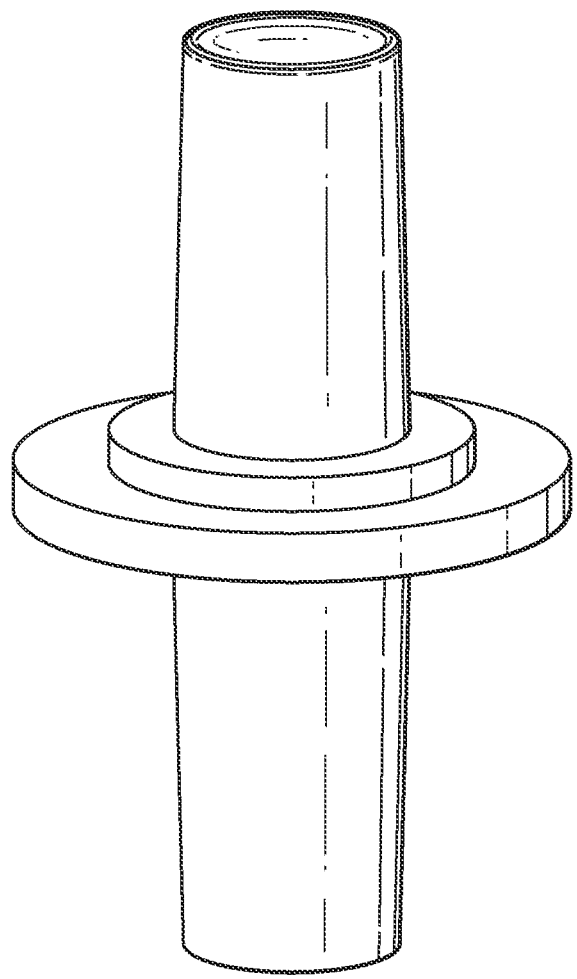
FIG. 6 is a detail of the encased magnetically-responsive element of the invention.

In FIGS. 4 to 6, the identifier 8 is embedded in a protective casing 23 such as a thick and rigid plastic element. The casing comprise a tubular longitudinal portion 24 for receiving the portion of sheath (including one or more glass coated wires) inserted therein. The tubular portion 24 is preferably liquid-tightly closed to avoid ingress of liquid during brewing. It should be noted that the magnetically-sensitive identifier 8 can extend on the same distance (d) from each side of plane P so that it offers the same readability with the detecting means whatever the side of insertion of the capsule in the brewing chamber. In an alternative the element 8 could also extend on a different distance (d) from each side of median transversal plane P. The casing could, for instance, also abut on the surface of the ingredient to contact at least one of the covering walls 2, 3. For protection, the identifying element 8 is preferably of a length L smaller than twice the distance d. Furthermore, its ends are preferably inset relative to the ends 26, 27 of the casing.

The casing can be provided with a disc portion 25 which protrudes from the centre of the casing along the central plane P. The disc portion may assure several functions, one of which can be to enhance the position and stability of the casing in the mass of beverage ingredients in particular before compaction of the powder to form the tablet. The casing is less prone to moving during compaction of the ingredient into the tablet and can be better maintained along its extension axis I. Another function of the portion of disc 25 is to force the flow of liquid traversing the capsule from wall 2 to wall 3 to be guided in transversal direction above the portion of disc. It is observed that the portion of disc influences positively the wetting of the beverage ingredients, in particular, for compacted coffee. The portion of disc could also be provided with several through-openings for distributing the flow also through the casing. The casing has closed ends 26, 27 obtained by an internal insert which fills the gap between the identifier 8 and the casing outer portion 23.

Of course, a slight deviation of the identifier relative to the axis I can be tolerated depending on the performance of the detecting means and of the identifier and their locations. In particular, a deviation of +/−45 degrees relative to the longitudinal axis is considered oriented substantially along axis I. However, most preferably, a maximal deviation of +/−10 degrees is recommended. In case, the identifier is inclined relative to axis I of a certain angle (a), the length (L) of the identifier should be maximized to remain readable such that its perpendicular projection, representing L. cos a on axis I, is sufficient to provide an axial component, i.e., preferably between 5 and 10 mm. The identifier may also as well be disposed in a parallel offset configuration relative to axis I. Also several individual identifiers can be disposed in the capsule, e.g., in parallel or slightly inclined configuration.

Figure 7:
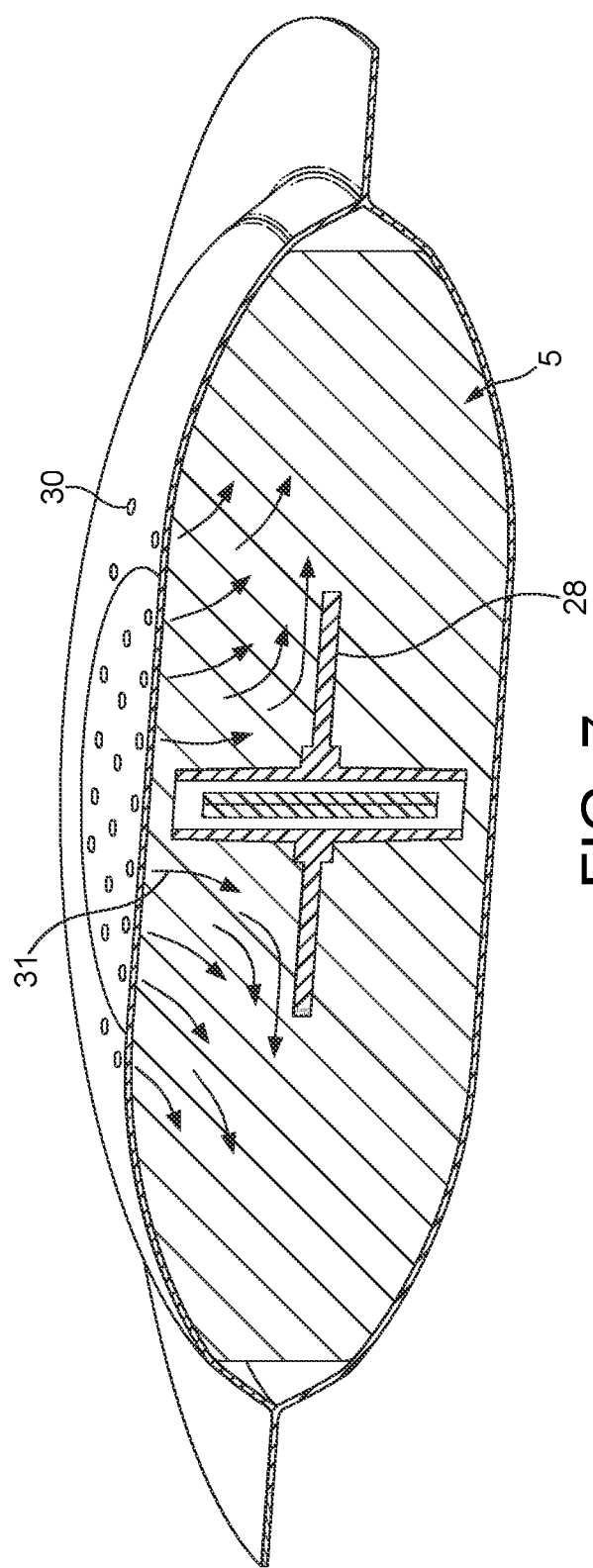
FIG. 7 is a partial cross sectional view of the capsule according to a third embodiment.

In FIG. 7, the casing has a portion of disc 28 of larger diameter than the diameter of disc 25 of the former example. The upper wall 3A is shown when perforated by multiple holes 30 for water to enter in the capsule. The flow of liquid is thus even more forced towards the periphery of the cavity 5 (See arrows 31).

In general, the disc portion (28) may also be traversed by multiple apertures to distribute liquid through the capsule more uniformly. The apertures may present different diameters depending on the flow pattern to be achieved in the capsule.

Figure 8:
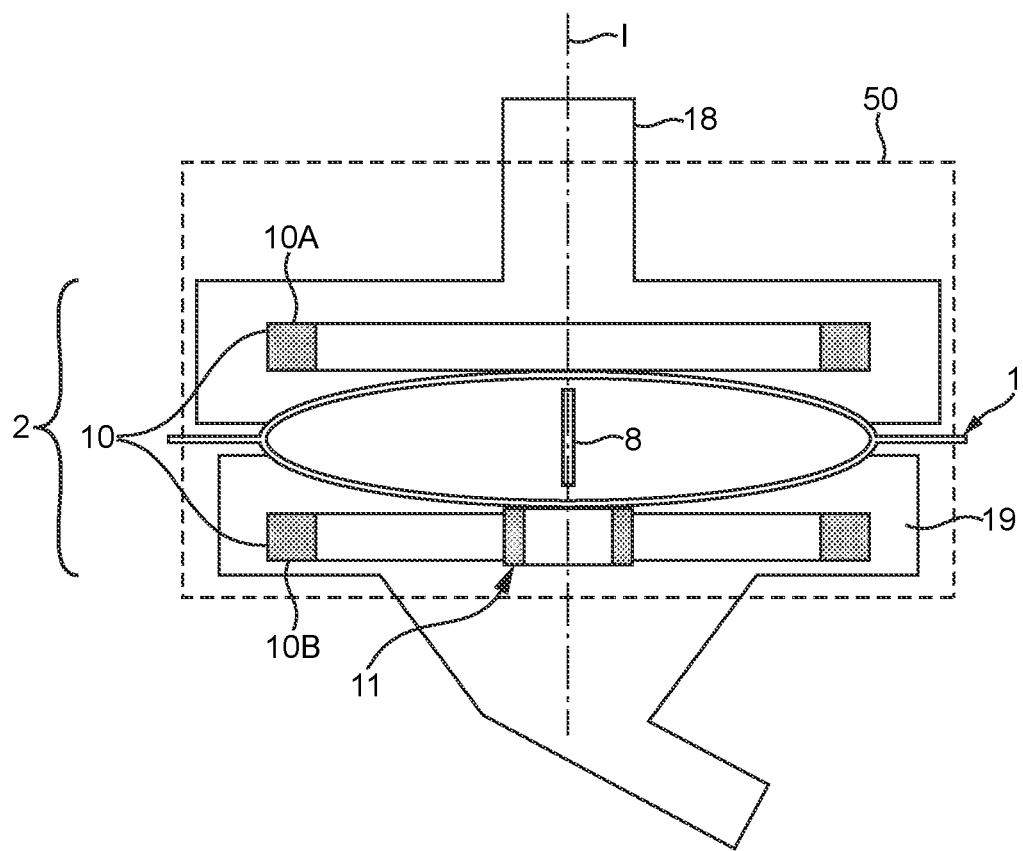
FIG. 8 illustrates another embodiment of the detecting device in a Helmholtz configuration.

FIG. 8 illustrates a beverage brewing unit according to another embodiment of the invention with a capsule inserted therein. For the detecting device, the electromagnetic emitter 10 is here configured as Helmholtz coils, respectively first and second coils 10A, 10B. The first and second emitting coils 10A, 10B are separated by a distance equivalent or close to the radius of the circular loops of the coils, which produces a homogeneous magnetic field in the median plane between the two coils. The two coils are preferably conducting circular coils each having N turns and each carrying a current separated by a distance preferably substantially equivalent to the radius of the circular loops in order to produce a homogeneous magnetic field in the median plane between the two circular coils. A receiving coil 11 is placed inside the second coil 10B. Each emitting coils may, for instance, be formed of a copper coil wire of diameter of 0.1 mm and with about 1000 turns. The receiving coil may be a shorter-diameter coil, e.g., made of a copper wire of diameter of about 0.1 mm and with about 1300 turns. In order to reduce the interference with outside electromagnetic sources, a shielding 50 against electromagnetic waves can be provided about the detecting device 2. The distance between the receiving coil and the capsule should be relatively small to ensure a correct detection of the received signal. Such shielding can be DC motor magnets, for instance, or a Faraday cage. The Faraday cage can be formed of a metallic housing placed around the brewing unit. It may also be a metallic lattice or a metallic painting.

Figure 9:
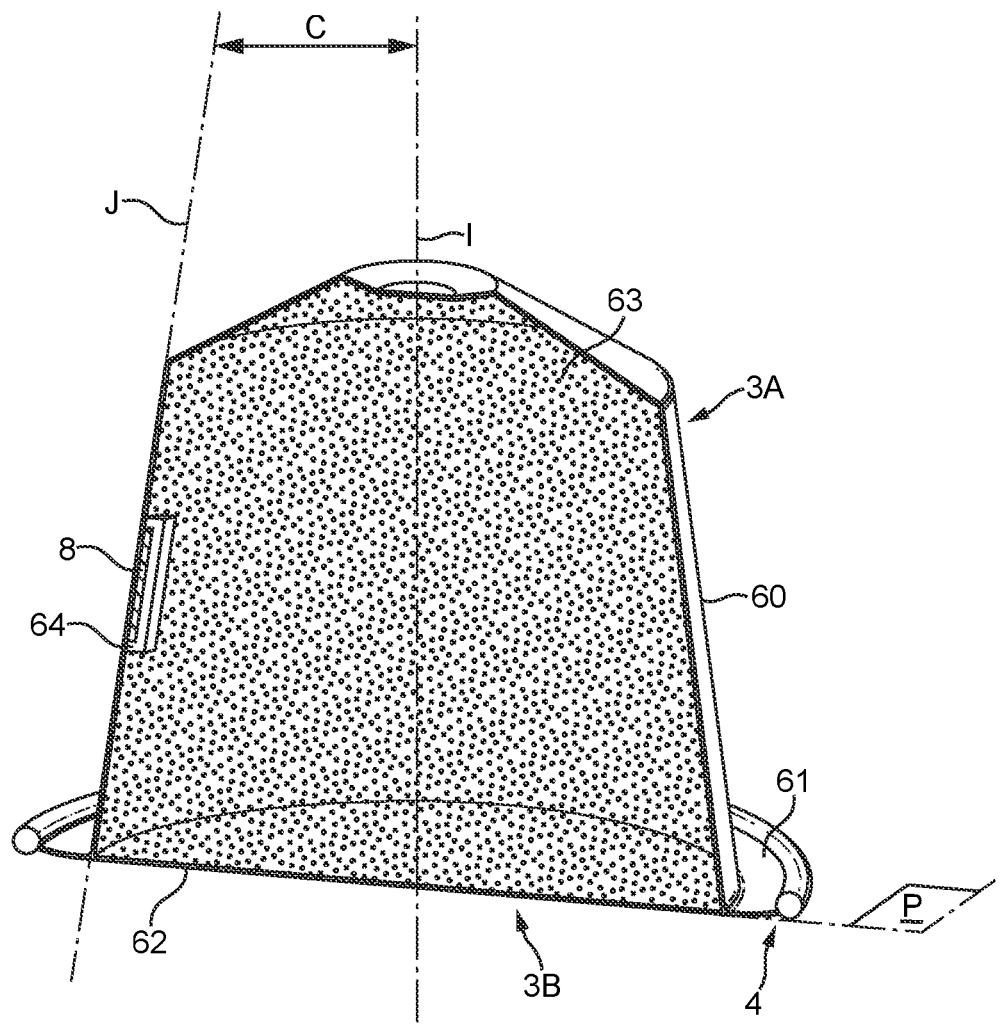
FIG. 9 illustrates a cross section view of a variant of the capsule of the invention.

In FIG. 9, the capsule of the present invention is non-symmetrical at its seam 4 and comprises a first covering wall 3A forming a cup-shaped body 60 with a lateral flange-like rim 61 extending outwardly. A second covering wall 3B forming a bottom wall 62 is sealed at seam 4 onto the rim 61. The bottom wall 62 can be a liquid-tight foil or be a filter element. The capsule contains beverage ingredient 63 such as ground coffee, tea, cocoa powder, milk powder and combinations thereof. The beverage ingredient may be in loose form in the capsule although eventually compressed to a certain extent before filling the body. In this mode, a magnetically sensitive element 8 is positioned and secured at the inner sidewall of the capsule. The element also extends as one or more wires oriented substantially along a linear direction J forming a short angle C relative to median axial direction I of the capsule. The element 8 is substantially orthogonal to transversal plane P passing via the seam 4. The direction J forms an angle of preferably less than 10 degrees relative to axis I, most preferably an angle between 0 and 8 degrees. The element 8 can be fixed to the inner side of the capsule by an adhesive label 64. It should be noted that the label can form the support for the wire(s) or for an extruded element including the wire(s) as described previously in relation to figures 1A and 1B. In the present embodiment, the identifying element 8 is protected by the rigid body but remains oriented substantially orthogonal to the longitudinal axis I for offering proper reading by the detecting means 2 placed at the brewing unit as aforementioned.

Figure 10:
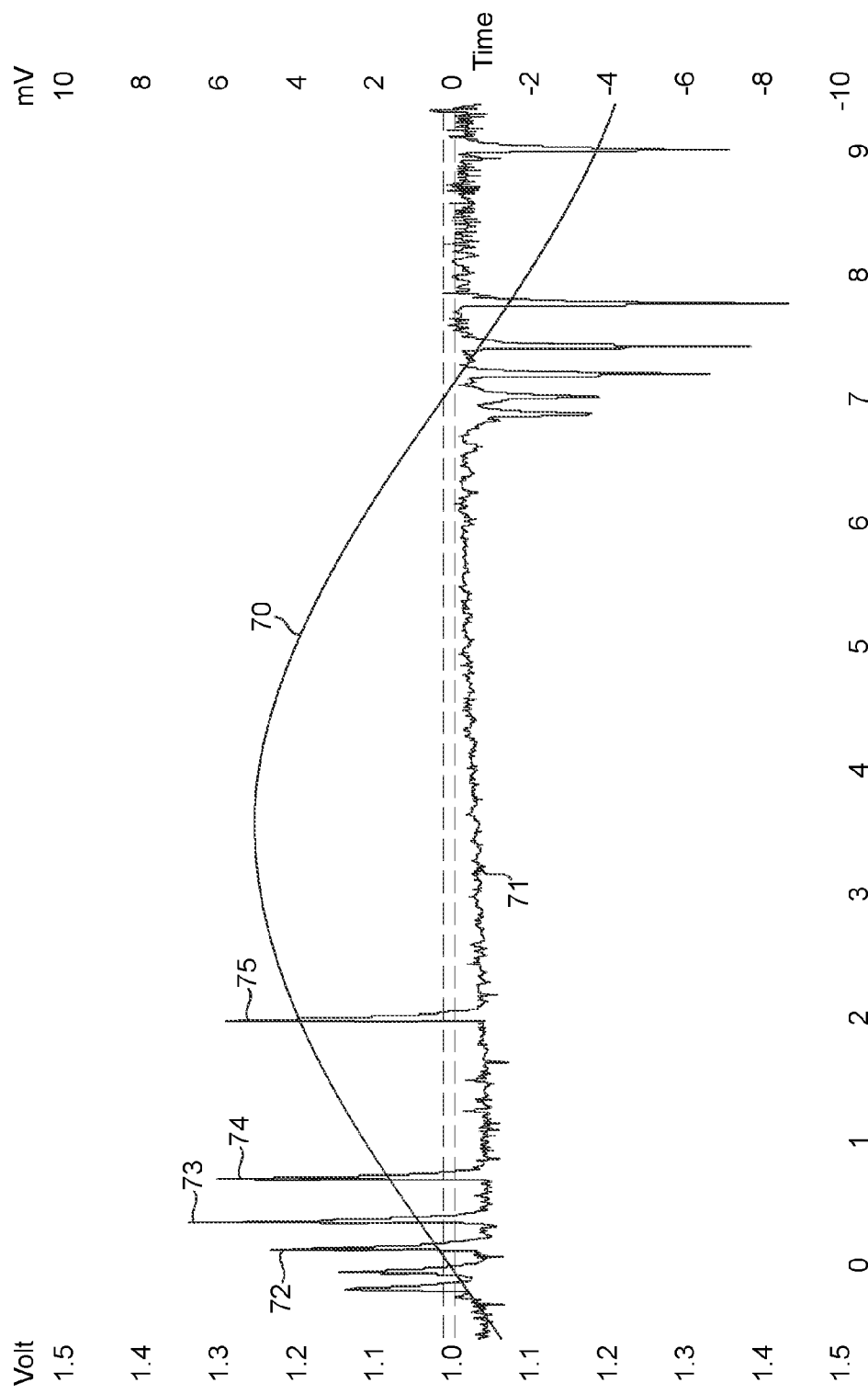
FIG. 10 illustrates an example of the emitted and received time-related voltage signals for a capsule containing an identifier.

The identifying method is carried out according to the following principles. The emitting coil (or coils) placed in the vicinity of the brewing unit, in the relative position described previously, excites the identifier to produce a sine-wave exciting signal. The emitted signal 70 (FIG. 10) without alteration forms a sinusoidal voltage signal representative of the electromagnetic field produced by the emitting coil. The signal is altered by the identifier in such a way that a Barkhausen effect affects the signal at predetermined phase locations of the signal, e.g., by a clear idenfiable jump at a certain position of the sine wave. The Barkhausen jump is due, as known per se, to a fast remagnetisation of the wire-element which produces a particular response to the applied magnetic field. If the voltage response is detected during this process in the receiving ("pick-up") coil(s), it materializes into one or more sharp peaks of the voltage signal related to time. This alteration is detected and analysed by comparing the difference resulting from the magnetic reference signal and the altered magnetic signal. For example, the difference between the emitted AC signal 70 of the emitter and the altered signal received by the receiver is represented by the signal's curve 71 illustrated on FIG. 10. More particularly, the position (i.e., coercivity) of the jump or jumps (or "peaks" 74-75) on curve 71 is measured and compared to different ranges of positions (i.e., coercivity ranges). Each range is thereby linked to a particular code corresponding to a type of capsule. Other parameters such as the amplitude and duration of the jump could be measured and identified to reference parameters to fine-tune the identification of the code.

Figure 11:
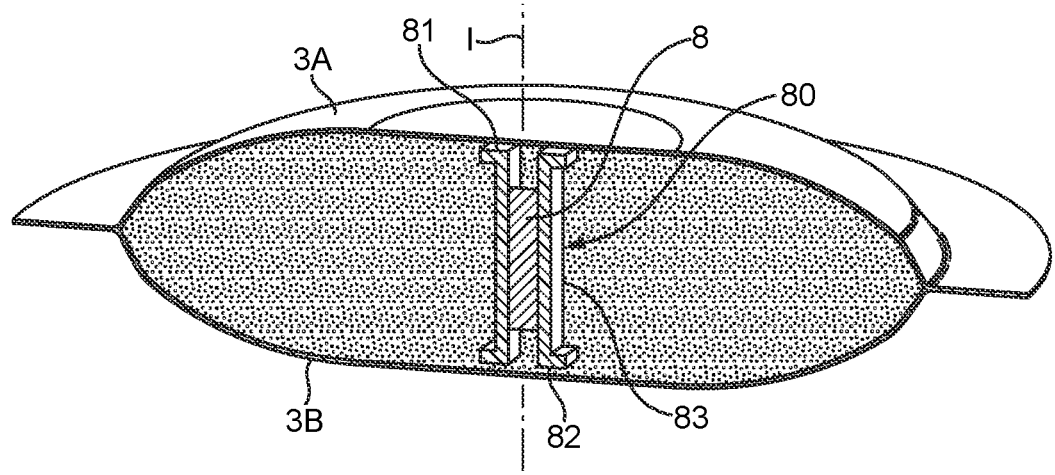
FIG. 11 is a schematic cross section of the capsule according to a variant.

FIG. 11 illustrates another possible variant of the capsule of the invention. In this embodiment, the identifying element 8 is maintained in a predetermined position inside the cavity of the capsule by an additional positioning member 80. The additional positioning member 80 determines the position of the identifying element 8 in the cavity, preferably, along longitudinal axis I of the capsule. In this case, the beverage ingredient does not create a support for the identifying element and could be either compacted or loose beverage ingredient or a combination thereof. The positioning member can be an elongated bracing means having at least one of its end 81, 82 in contact or connected to a covering wall 3A or 3B of the capsule. Preferably, a first end 81 comes in abutment against the covering wall 3A and its other end 82 comes in abutment or is connected to the second covering wall 3B. The positioning member 80 can further comprise a tubular portion 83 that encases the identifying element 8. The identifying element could be press fitted and/or glued into the tubular portion 83. Of course, the positioning member can take many other different shapes. For example, the two ends 81, 82 could be sealed to the covering walls. It should also be noticed that at least one of the covering walls could be open at the centre of these ends such as if the ends are sealed to the wall and hollow or tubular in their centre such forming a kind of conduit for the identifying element.

Although the invention has been described in relation to preferred modes, other possible variations are possible in particular in view of the detecting technology and the type of identifier. Also, the capsule may take different forms which are not necessarily symmetrical along plane P. For example, the capsule can have a cup-shaped body closed by a membrane. The capsule can also be formed of partially rigid packaging materials.

What is claimed is:

1. A capsule for the preparation of a beverage comprising:
   first and second covering walls connected at a peripheral seam with the walls forming a cavity therebetween that contains a beverage ingredient therein, with the capsule having a longitudinal axis, and wherein the beverage ingredient is compacted within the capsule; and
   a contactless identifying element for identifying the capsule by detecting the identifying element by detecting means of a beverage producing device;
   wherein the identifying element is disposed in the cavity with the beverage ingredient, and is positioned and oriented in the cavity such that the identifying element can be read by detecting means positioned substantially concentrically around the longitudinal axis of the capsule.

2. The capsule according to claim 1, wherein the identifying element is a magnetically-responsive element for enabling detection of the capsule in the presence of a magnetic field produced by a magnetic field producing device.

3. The capsule according to claim 2, wherein the magnetically-responsive element is oriented substantially along the longitudinal axis of the capsule.

4. The capsule according to claim 1, wherein the capsule has a symmetrical shape about the peripheral seam and the magnetically-responsive element is elongated and extends, along its longest dimension, substantially perpendicularly to the transversal plane.

5. The capsule according to claim 1, wherein the magnetically-responsive element comprises magnetically-responsive material providing at least one Barkhausen jump in a detected time-related voltage signal in response to the electromagnetic field.

6. The capsule according to claim 5, wherein the magnetically-responsive element comprises at least one cover, sheath, strip, ribbon or label containing the magnetically responsive material.

7. The capsule according to claim 5, wherein the magnetically-responsive material comprises at least one wire having a core of a combination or alloy of different metals, metalloids or other magnetically-responsive components and a glass coating surrounding the core.

8. The capsule according to claim 1, wherein the magnetically-responsive element has a longer dimension of between 5 and 20 mm.

9. The capsule according to claim 1, wherein the magnetically-responsive element is elongated.

10. The capsule according to claim 9, wherein the magnetically-responsive element is provided in a protective casing which is at least partially embedded in the beverage ingredient.

11. The capsule according to claim 1, wherein the beverage ingredient comprises roast and ground coffee.

12. The capsule according to claim 11, wherein the beverage ingredient is compacted about the identifying element to align it in the capsule.

13. The capsule according to claim 1, wherein the contactless identifying element is distanced from both the first and second covering walls of the capsule.

14. The capsule according to claim 1, wherein the identifying element is elongated and comprises lengthwise a longitudinal surface delimited by two transversal ends and the element is in contact with one or both of the first or second covering walls by at least one of its transversal ends but not in contact along its longitudinal surface with the walls.

15. A beverage producing device comprising:
   the capsule of claim 1;
   a brewing unit configured and dimensioned to receive the capsule; and
   detecting means for detecting the identifying element contained in the capsule, the detecting means positioned substantially concentrically around the median longitudinal axis of the brewing chamber.

16. A capsule for the preparation of a beverage comprising:
   first and second covering walls connected at a peripheral seam and forming a cavity therebetween that contains a beverage ingredient therein, wherein the beverage ingredient is compacted within the capsule; and
   a contactless, magnetically responsive identifying element that identifies the capsule, with the element disposed in the cavity and at least partially embedded in the beverage ingredient;
   wherein the capsule has a longitudinal axis and the identifying element is aligned along or parallel to the longitudinal axis of the capsule by the compacted beverage ingredient.

17. The capsule according to claim 16, wherein the magnetically-responsive element comprises at least one part selected from the group consisting of a cover, sheath, strip, ribbon and label wherein the at least one part includes at least one wire having a core of a combination or alloy of different metals, metalloids or other magnetically-responsive components and a glass coating surrounding the core, with the magnetically-responsive element being elongated and having a longer dimension of between 5 and 20 mm, and with the magnetically-responsive element present in a protective casing.

18. The capsule according to claim 16, wherein the identifying element is elongated and comprises lengthwise a longitudinal surface delimited by two transversal ends with the element located within the beverage ingredient in the cavity and in contact with one or both of the first or second covering walls by at least one or both of its transversal ends but not in contact along its longitudinal surface with the walls.

19. A beverage producing device comprising:
   the capsule of claim 16;
   a brewing unit configured and dimensioned to receive the capsule; and
   detecting means for detecting the identifying element contained in the capsule, the detecting means positioned substantially concentrically around the median longitudinal axis of the brewing chamber.

* * * * *